United States Patent Office 3,573,255
Patented Mar. 30, 1971

3,573,255
CURABLE POLYMERIC COMPOSITIONS CONTAINING AS A CURING CATALYST N-SEC-ALKYL OR N-CYCLOALKYL ALKOXYAMINE
Henryk A. Cyba, Evanston, Ill., assignor to Universal Oil Products Company, Des Plaines, Ill.
No Drawing. Continuation-in-part of application Ser. No. 543,008, Apr. 18, 1966, now Patent No. 3,478,096, dated Nov. 11, 1969. This application May 28, 1969, Ser. No. 828,719
Int. Cl. C08g 30/14
U.S. Cl. 260—47                              12 Claims

ABSTRACT OF THE DISCLOSURE

A curable polymeric composition containing a curing catalyst comprising N-substituted alkoxyamine.

CROSS REFERENCE TO RELATED APPLICATIONS

This is a continuation-in-part of application Ser. No. 543,008 filed Apr. 18, 1966, now U.S. Pat. No. 3,478,096 issued Nov. 11, 1969.

BACKGROUND OF THE INVENTION

A number of polymeric compositions undergo curing during the manufacture thereof as, for example, polyurethane, epoxy resin, polycarbonate, etc. In order to facilitate the curing process a catalyst is used and a number of these are described in the prior art.

DESCRIPTION OF THE INVENTION

Parent application 543,008 discloses certain substituted alkoxyalkyl amines which are novel compositions of matter. Among other uses, these compounds are effective curing catalysts and the present applications is directed to this feature.

In one embodiment the present invention relates to a curable polymeric composition containing a curing catalyst of the following structure:

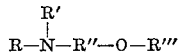

where R is sec-alkyl or cycloalkyl, R' is hydrogen, sec-alkyl, cycloalkyl or hydroxyalkyl, R" is alkylene, and R''' is alkyl or hydroxyalkyl.

In a particularly preferred embodiment, R is sec-alkyl of from 3 to about 20 carbon atoms or cycloalkyl containing from 3 to about 8 carbon atoms in the ring, R' is hydrogen, sec-alkyl of from 3 to about 20 carbon atoms or cyclohexyl, R" is alkylene of from 2 to about 10 carbon atoms and R''' is alkyl of from 1 to about 10 carbon atoms or hydroxyalkyl of from 1 to about 10 carbon atoms.

Illustrative compounds in which R" contains 2 carbon atoms include

N-isopropyl-2-methoxyethylamine,
N-sec-butyl-2-methoxyethylamine,
N-sec-pentyl-2-methoxyethylamine,
N-sec-hexyl-2-methoxyethylamine,
N-sec-heptyl-2-methoxyethylamine,
N-sec-octyl-2-methoxyethylamine,
N-sec-nonyl-2-methoxyethylamine,
N-sec-decyl-2-methoxyethylamine,
N-sec-undecyl-2-methoxyethylamine,
N-sec-dodecyl-2-methoxyethylamine,
N-sec-tridecyl-2-methoxyethylamine,
N-sec-tetradecyl-2-methoxyethylamine,
N-sec-pentadecyl-2-methoxyethylamine,
N-sec-hexadecylmethoxyethylamine,
N-sec-heptadecyl-2-methoxyethylamine,
N-sec-octadecyl-methoxyethylamine,
N-sec-nonadecyl-2-methoxyethylamine,
N-sec-eicosyl-methoxyethylamine, etc;
N,N-di-isopropyl-2-methoxyethylamine,
N,N-di-sec-butyl-2-methoxyethylamine,
N,N-di-sec-pentyl-2-methoxyethylamine,
N,N-di-sec-hexyl-2-methoxyethylamine,
N,N-di-sec-heptyl-2-methoxyethylamine,
N,N-di-sec-octyl-methoxyethylamine,
N,N-di-sec-nonyl-2-methoxyethylamine,
N,N-di-sec-decyl-2-methoxyethylamine, etc;
N-cyclopropyl-2-methoxyethylamine,
N-cyclobutyl-2-methoxyethylamine,
N-cyclopentyl-2-methoxyethylamine,
N-cyclohexyl-2-methoxyethylamine,
N-cycloheptyl-2-methoxyethylamine,
N-cyclooctyl-2-methoxyethylamine, etc;
N,N-dicyclopropyl-2-methoxyethylamine,
N,N-dicyclobutyl-2-methoxyethylamine,
N,N-dicyclopentyl-2-methoxyethylamine,
N,N-dicyclohexyl-2-methoxyethylamine,
N,N-dicycloheptyl-2-methoxyethylamine,
N,N-dicyclooctyl-2-methoxyethylamine, etc., as well as N,N-di-sec-alkyl-2-methoxyethylamines in which the sec-alkyl groups are different, N,N'-di-cycloalkyl-2-methoxyethylamines in which the cycloalkyl groups are different, and N,N-di-substituted 2-methoxyethylamines in which one substituent is sec-alkyl and the other substituent is cycloalkyl, the sec-alkyl and cycloalkyl groups being selected from those hereinbefore set forth.

The specific compounds set forth above comprise those in which R''' is an alkyl of one carbon atom. When R''' contains a larger number of carbon atoms, the correspondingly N-substituted-alkoxyethylamines will be N-substituted-2-ethoxyethylamine,
N-substituted-2-propoxyethylamine,
N-substituted-2-butoxyethylamine,
N-substituted-2-pentoxyethylamine,
N-substituted-2-hexoxyethylamine,
N-substituted-2-heptoxyethylamine,
N-substituted-2-octoxyethylamine,
N-substituted-2-nonoxyethylamine,
N-substituted-2-decoxyethylamine, etc. While R''' preferably is an alkyl group, in another embodiment R''' is a cycloalkyl group. Illustrated compounds in this embodiment include N-substituted-cyclopentoxyethylamine, N-substituted-cyclohexoxyethylamine, N - substituted-cycloheptoxyethylamine, N - substituted - cyclooctoxyethylamine, etc.

Similarly, when R" contains more than 2 carbon atoms the compound will comprise the correspondingly N-substituted alkoxy-2-propylamine, 3-propylamine, 2-butylamine, 3 - butylamine, 4-butylamine, 2-pentylamine, 3-pentylamine, 4-pentylamine, 5-pentylamine, 2-hexylamine, 3-hexylamine, 4-hexylamine, 5-hexylamine, 6-hexylamine, etc.

It is understood that, when R″ and/or R‴ is an alkyl group of 3 or more carbon atoms, the alkyl group may be of straight or branched chain, and also that R″ and/or R‴ may be of primary, secondary or tertiary alkyl configuration. Illustrative compounds in the last mentioned embodiment include N-substituted-isopropoxyalkylamine, N-substituted-tert-butoxyalkylamine, N - substituted-tert-pentoxyalkylamine, N-substituted-tert-hexoxyalkylamine, etc.

When R‴ is a hydroxyalkyl, the hydroxyalkyl group preferably contains from 1 to about 10 carbon atoms and thus this group will be selected from hydroxymethyl, hydroxyethyl, hydroxypropyl, hydroxybutyl, hydroxypentyl, hydroxyhexyl, hydroxyheptyl, hydroxyoctyl, hydroxynonyl and hydroxydecyl. Illustrating but not limiting examples of compounds in this embodiment include N-sec-alkyl - hydroxymethoxyalkylamine, N,N - di-sec-alkylhydroxymethoxyalkylamine, N-cycloalkylhydroxymethoxyalkylamine, N,N - dicycloalkyl hydroxymethoxyalkylamine and corresponding compounds in which the alkoxy group contains from 2 to about 10 carbon atoms.

The novel compounds of the present invention may be prepared in any suitable manner. In a preferred method, the alkoxyalkylamine is subjected to reductive alkylation with a ketone in the presence of hydrogen and a reductive alkylation catalyst. The ketone will be selected to produce the desired substitution or substitutions on the nitrogen atom. Illustrative but not limiting ketones include acetone, Methylethyl ketone, methylpropylketone, methylbutylketone and corresponding methylalkyl ketones in which the alkyl group contains from 5 to about 18 carbon atoms, diethylketone, ethylpropylketone, ethylbutylketone, ethylpentylketone and corresponding ethylalkylketones in which the alkyl group contains from 6 to 17 carbon atoms, dipropylketone, propylbutylketone, propylpentylketone, propylhexylketone and corresponding propylalkylketones in which the alkyl group contains from 7 to 16 carbon atoms. Other higher molecular weight ketones may be used. It is understood that a mixture of these ketones may be employed.

When the substituent is a cycloalkyl group, cycloalkyl ketones are used and include cyclopropanone, cyclobutanone, cyclopentanone, cyclohexanone, cycloheptanone, cyclooctanone, etc. Here again it is understood that a mixture of cycloalkylketones may be used, as well as a mixture of the alkyl and cycloalkylketones.

The reductive alkylation is effected in any suitable manner and either in a single or multiple step operation. In a particularly preferred method, the reductive alkylation is effected in a single step employing a hydrogen pressure of from about 100 to 3,000 p.s.i.g. or more. Any suitable catalyst is employed including those containing nickel, cobalt, platinum, palladium, molybdenum, etc. or a mixture of these or of the oxides of chromium, copper and barium, preferably composited with a suitable support. A particularly preferred catalyst comprises a composite of platinum and alumina, containing from about 0.1 to 2% by weight of platinum, which may or may not contain chlorine and/or fluorine in a total halogen content of from about 0.01% to about 5% by weight. When using the platinum catalyst, the temperature generally will be in the range of about 200° to about 500° F. In a preferred continuous operation the catalyst is deposited as a fixed bed in a reaction zone and the reactants, at the desired temperature and pressure, are passed therethrough, in either upward or downward flow. Generally, an excess of ketone to alkoxyalkylamine is used and this excess may range from 1.5 to 20 mols of ketone per mol of alkoxyalkylamine.

The alkoxyalkylamine may be obtained from any suitable source or prepared in any suitable manner. Alkoxyethylamine may be prepared by reacting hydroxyacetonitrile with a suitable etherifying agent, including dialkylsulfates, alkyl halides and in some cases alcohols and ethers, followed by reduction. Thus, methoxyethylamine may be prepared by reacting hydroxyacetonitrile with dimethylsulfate, methyliodide, methylbromide or methylchloride, in the presence of caustic, or with methylalcohol or dimethylether under high temperature (300 to 450° F.) and high pressure (100–2000 p.s.i.g.). The mol ratio of hydroxyacetonitrile to etherifying agent will be within the range of 0.8:1 to about 1.25:1. Similarly, alkoxypropylamine is prepared by the etherification of hydroxyacrylonitrile, followed by reduction. The reduction is effected in any suitable manner by reacting with hydrogen in the presence of a hydrogenation catalyst including nickel, chromia, molybdena, platinum, palladium, etc., or mixtures thereof, preferably composited with a suitable support. The hydrogenation is effected at a temperature of from about 100° F. to 500° F. and a pressure of from 100 to about 3000 p.s.i.g. Other alkoxyalkylamines are prepared in the same general manner as set forth above or in any other suitable manner.

The preparation of the novel compounds of the present invention may be effected in the presence of a suitable solvent in any stage of preparation. Particularly preferred solvents comprise hydrocarbons and more particularly aromatic hydrocarbon including benzene, toluene, xylene, ethylbenzene, cumene, etc. or mixtures thereof, paraffin hydrocarbon including particularly pentane, hexane, heptane, octane, etc. or mixtures thereof, or mixtures of paraffin and aromatic hydrocarbons, as well as mixtures such as gasoline, naphtha, etc. In some cases the solvent may comprise an alcohol including methanol, ethanol, propanol, butanol, etc. The solvent may be removed in any suitable manner and particularly by vacuum distillation.

As hereinbefore set forth, the compound of the present invention is used as a curing catalyst for various resins and foams including particularly polyurethanes and polyurethane foams. The polyurethanes generally are prepared by the reaction of an isocyanate with a polyol and/or polyester as, for example, by the reaction of toluene-2,4-diisocyanate with polytetramethyleneether glycol, alone or in combination with other additional diols and/or other diisocyanates. A preferred diisocyanate is toluene-2,4-diisocyanate or the commercially available mixture of from about 60 to about 90% by weight of toluene-2,4-diisocyanate and from about 10 to about 40% by weight of toluene-2,6-diisocyanate. Other diisocyanates include 4-methoxy-1,3-phenylene diisocyanate, 4-isopropyl-1, 3-phenylene diisocyanate, 4-ethoxy, 4-ethoxy-1,3 - phenylene diisocyanate, 2,4' - diisocyanatodiphenylether, diphenylmethane diisocyanate, 3,3'-dimethyl-4,4'-diisocyanatodiphenylmethane, 3,3' - dichloro - 4,4' - diisocyanatodiphenylmethane, 3,3'-dialkoxy-4,4'-diisocyanatodiphenylmethane, 1,5 - naphthylenediisocyanate, mesitylenediisocyanate, durylenediisocyanate, xylylenediisocyanate, hexamethylenediisocyanate, etc. Triisocyanates include toluene-2,4,6-triisocyanate, 2,4,4'-triisocyanatodiphenylether, 2,4,4' - triisocyanatodiphenylmethane, triphenylmethane triisocyanate, etc. Other isocyanates include various polyfunctional and blocked polymeric isocyanates such as phenol blocked TDI trimer, polymethylene polyphenyl isocyanate of the following general composition:

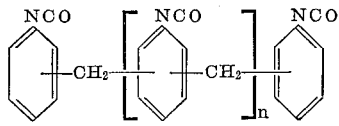

etc. It is understood that a mixture of the polyisocyanates may be employed.

Any suitable polyol or hydroxyl terminated polyester containing two hydroxyl groups is reacted with the polyisocyanate. Illustrative polyols include polypropyleneether glycol, 1,2-polydimethylethyleneether glycol, ethylene oxide-modified polypropyleneether glycol, polytrimethyleneether glycol, polytetramethyleneether glycol, polypentamethyleneether glycol, polydecamethyleneether glycol, polytetramethyleneformal glycol, etc. Polypropyleneether glycol and polytetramethyleneether glycol are preferred. Particularly preferred is polytetramethyleneether glycol having a molecular weight of from about 400 to about 2000. In another embodiment, polyalkylenearyleneether glycols are used. These correspond to the polyalkyleneether glycols, except that some of the alkylene radicals have been replaced by arylene radicals, preferably phenylene and naphthylene radicals. In addition, ethylene glycol, diethylene glycol, triethylene glycol, tetraethylene glycol, propylene glycol, trimethylol alkanes, 1,2,6-hexanetriolpentaerylthritol, dipropylene glycol, polycaprolactone diols, glycol etheramines such as monoethanolamine, diethonalamine, triethanolamine, diglycolamine, polyalkyleneetherdiamines, N,N,N',N' - tetrakis (2-hydroxypropyl) ethylene diamine, N,N,N¹,N²,N²-pentakis (2-hydroxyethyl)-diethylenetriamine, 1,4-bis-(2-hydroxypropyl)-2-methylpiperazine, etc. Also included are polyoxyalkylene derivatives of alkylene glycols, glycerol, trimethylolalkanes, pentaerythritol, alkylenediamines, sorbitol, 2-methylglucoside, sucrose; various phosphorus containing polyols, phosphorus and halogen containing polyols, vinyl-resin-reinforced polyether-polyols, etc.

Polyesters containing two hydroxyl groups are prepared from diabasic acids, including, for example, adipic acid, phthalic acid, sebacic acid, etc. Other dibasic acids include oxalic acid, malonic acid, succinic acid, suberic acid, azelaic acid, maleic acid, dimer acid, etc., as well as anhydrides thereof including succinic anhydride, phthalic anhydride, etc. These esters are prepared by the reaction of the dibasic acid with a diol including, for example, ethylene glycol, propylene glycol, 1,3-propanediol, thiodiglycol, diethylene glycol, 1,2-alkylene oxide-modified glycol, etc.

The polyurethane, resin, plastic, foam, either flexible, semi-flexible or rigid, is prepared in a conventional manner except for the use of the novel curing catalyst of the present invention in place of and/or in addition to conventional catalysts. Conventional preparations depending upon the specific product desired, include additional materials such as flame retardant additive, filler, extender, bacteriostat, pigment and the like, as well as curing (cross linking) agents. When foam is desired, the polymeric composition includes water or other foaming or blowing agents. These are well known in the art and need not be repeated herein. It is sufficient to state that the preparation of the desired polyurethane product is prepared in conventional manner except that the novel curing catalyst of the present invention is used in place of or in addition to the catalyst heretofore used in the prior art. The catalyst of this application may be used in moisture-cured urethane coatings, elastomers, urethane alkyds, flexible urethane foams based on polyesters, semi-rigid urethane foams, etc.

In another embodiment the compound of the present invention is used as a curing catalyst for epoxy resins. The epoxy resins are formed by the reaction of a 1,2-epoxy compound and a dihydric phenol or polyalcohol, as, for example, the reaction of an epichlorohydrin with bisphenol-A(2,2-bis-(4-hydroxyphenyl)-propane). By varying the ratio of epichlorohydrin and bis-phenol-A, resins may be produced which range from low viscosity material to high melting solids. Included in the epoxidized resins are the epoxy cresol novalac resins and the epoxy phenol novalac resins. Another epoxy resin is prepared from epoxy compounds in which the epichlorohydrin groups are attached directly to the cycloaliphatic portion of the molecule rather than on the alkyl chains. Here again, cross linking agents, as well as other conventional ingredients, are included in the composition. As before, these ingredients and methods of preparation are well known in the art and need not be repeated here, with the understanding that these preparations will utilize the novel curing catalyst of the present invention in place of and/or in addition to conventional curing catalysts.

Another resin which is subjected to curing is polycarbonates. The polycarbonates comprise polyesters of carbonic acid, which are derived from dihydroxyl compounds in which the hydroxyl groups are directly attached to aromatic rings as, for example, the polyester prepared by reacting carbonic acid and bisphenol-A. Here again conventional ingredients and methods of processing are utilized except for the noval curing catalyst of the present invention which is used in place of and/or in addition to the prior art curing catalyst.

The previous discussion refers to conventional curing catalysts. These include short chain amides, such as dicyandiamide, tertiary amines such as benzyldimethylamine, non-functional secondary amines such as piperidine, etc. Conventional cross linking agents include diethylene triamine, triethylene tetramine, aminoethyl piperazine, amine adducts, secondary aliphatic polyamines such as piperazine, polyamides, primary aromatic polyamines, etc. Also used as cross linking agents are various acid anhydrides, including hexahydrophthalic anhydride, tetrahydrophthaic anhydride, methylenedomethylene, maleic anhydride, dodecenyl succinic anhydride, chlorendic anhydride, etc. A recently proposed anhydride for acting both as cross linking agent and as a flame retardant is 5,6,7,8,9,9 - hexachloro - 1,2,3,4,4a,5,8,8a-octahydro-5,8-methano-2,3-naphthalene dicarboxylic anhydride, as well as derivatives thereof. As hereinbefore set forth, the novel curing catalyst of the present invention may be used in admixture with one or more of the above compounds.

The concentration of the curing catalyst of the present invention generally will be within the range of from about 0.05% to about 1% by weight of the polymeric composition.

The following examples are introduced to illustrate further the novelty and utility of the present invention but not with the intention of unduly limiting the same.

Example I

This example and a number of the following examples describe the preparation of polyurethane form. The basic formulation is the same except for the particular curing catalyst. The ingredients and concentrations thereof are as follows.

| Ingredient: | Parts by weight (grams) |
|---|---|
| Polyol-Witco G–3530 (reaction product of propylene oxide and glycerin) | 404.0 |
| Polymeric silicone surfactant L–540 | 4.0 |
| Deionized water | 14.1 |
| n-Lauryl morpholine | 1.2 |
| Stabilized stannous octoate T–9 (stabilizer is 2,6-di-tertiarybutyl-4-methylphenol) | 0.6 |
| Toluene disocyanate (commercial 80/20 mixture of 2,4- and 2,6-isomers) | 175.0 |
| Curing catalyst | 1.0 |

The foam was prepared by first mechanically stirring for 4½ minutes a mixture of the polyol and silicone, then adding the water, curing catalyst to be hereinafter described and n-lauryl morpholine and mechanically stirring the mixture for 7½ minutes. The stannous octoate and toluene diisocyanate were added and the mixture was stirred for 5–7 seconds and then poured into a mold which was preheated to a temperature of about 105° F. and was pretreated with a mold releasing agent. The foam then is cured in an air circulating oven at 300° F. for 25 minutes. The results are reported as the ILD values and also by the SAG factor (ratio of the loads necessary to produce 65% and 25% indentations in the foamed product). This is ASTM method D1564–64T (load deflection test).

The curing catalyst of this example was N,N-di-isopropyl-2-ethoxyethylamine and was prepared by the general method as described in the patent application. In these evaluations the foam had an original thickness of about 4 inches. As set forth above, the curing catalyst was used in a concentration of 1.0 g. The results of the evaluation are reported in the following table, in which the up and down refer to the hysteresis curve.

| Up, lbs | Inches | Down, lbs. |
|---|---|---|
| 30.5 | 0.5 | 19.5 |
| 40.5 | 1.0 | 26.0 |
| 53.5 | 1.5 | 36.0 |
| 69.5 | 2.0 | 48.5 |
| 98.0 | 2.5 | 74.0 |
| 193.0 | 3.0 | 165.5 |
| 249.0 | 3.101 | |

The SAC factor is 2.5.

Example II

The curing catalyst of this example is N,N-dicyclohexyl-2-ethoxyethylamine and similarly was prepared by the general method as described in the parent application. Also, as hereinbefore set forth, the curing catalyst was used in a concentration of 1.0 g. When evaluated in the above manner the following results were obtained.

| Up, lbs | Inches | Down, lbs. |
|---|---|---|
| 30.5 | 0.5 | 20.0 |
| 41.5 | 1.0 | 27.0 |
| 54.0 | 1.5 | 36.5 |
| 70.0 | 2.0 | 50.0 |
| 98.5 | 2.5 | 75.0 |
| 199.5 | 3.0 | 170.0 |
| 260.0 | 3.099 | |

The SAC factor is 2.44.

Example III

This example reports the results obtained when using a conventional catalyst of the prior art. The catalyst used in this example was "DABCO" (triethylenediamine) and also was used in a concentration of 1.0 g. The results of an evaluation made in the same manner as described in Example I are as follows:

| Down, lbs. | Inches | Up, lbs. |
|---|---|---|
| 33.5 | 0.5 | 21.5 |
| 44.0 | 1.0 | 28.5 |
| 56.0 | 1.5 | 38.0 |
| 70.5 | 2.0 | 50.5 |
| 96.0 | 2.5 | 74.0 |
| 175.5 | 3.0 | 153.0 |
| 219.0 | 3.102 | |

The SAC factor is 2.22.

In comparing the results obtained with the commercial curing catalyst, it will be noted that the curing catalyst of Examples I and II gave higher SAG factors and also higher ILD values.

Example IV

One-shot polyether foam is prepared by mixing 50 parts of 3000 molecular weight triol (Wyandotte) with 50 parts of 4000 molecular weight triol. 1.5 parts of L-520 silicon stabilizer (poly-siloxane-poly-oxyalkylene block copolymer described in U.S. Pat. 2,834,748) is added together with 0.25 parts of stannous octoate. N-sec-butyl-bis-(3-ethoxypropyl)amine in a concentration of 0.15 parts is used as curing catalyst and is added together with 3.5 parts water and 44 parts of toluenediisocyanate (TDI). The foam is cured at 250° F. for one hour.

Example V

N - cyclohexyl-N-hydroxypropyl-ethoxyethylamine is used as a curing catalyst for an epoxy resin. The epoxy resin is marketed under the trade name of "Epon 828" and is a liquid at room temperature, having a viscosity at 77° F. of 100–160 poises, a maximum Gardner color of 8, and an epoxide equivalent (gram of resin containing one gram equivalent of epoxide) of 175–210 and a weight of 9.7 gallons per pound at 68° F.

The epoxy resin described above is cured by stirring the N-cyclohexyl-N-hydroxypropyl-ethoxyethylamine, together with tetrahydrophthalic anhydride. In order to avoid air bubbles in the system, the mixture of resin and curing catalyst is heated prior to pouring into the mold. The mold is first coated with a conventional release agent to avoid sticking thereto. The mold containing the resin and curing catalyst is cured in a conventional oven at 212° F. for 6 hours.

Example VI

A mild temperature cured adhesive is prepared by mixing 75% of Epon resin of molecular weight of 450 with 25 parts of polyglycidyl ether of glycerol and 10 parts of allylglycidyl ether. In addition, 100 parts of alumina powder are mixed in the formulation. The formulation is cured with 5 parts of N,N - dicyclohexyl-2-ethoxyethylamine.

EXAMPLE VII

Semi-rigid foam is prepared by mixing 90 parts of polyol SF-6500 (a triol of molecular weight of 6500 and hydroxyl value of 25) with 30 parts of barium sulfate, 10 parts of N,N,N',N' - tetrakis - (2-hydroxypropyl)-ethylenediamine, 2 parts of water, 1–5 parts of N,N-dicyclohexyl - 2 - ethoxyethylamine and polyamine isocyanate mondur MR containing 31.5% NCO groups to give an isocyanate index of 105. The mixture is poured into a polyethylene film lined aluminum mold and cured 20 minutes at about 85° F.

Example VIII

A free rise semi-rigid foam is prepared by mixing 85 parts of SF-6500 (a triol of molecular weight of 6500 and hydroxy value of 25), 15 parts of 1–4 butane diol, 1 part of water, 1 part of N-hydroxyethyl-N-cyclohexyl-ethoxymethylamine and polymeric isocyanate mondur MT-40 containing 40% of isocyanate groups to give an isocyanate index of 105.

Example IX 100 g. of triol of molecular weight of 3530 is mixed with 1–5 parts of silicone surfactant #540, 3.5 parts of water, 0.2 parts of N-hydroxypropyl-N-cyclohexyl-ethoxyethylamine, 0.15 part of stannous octoate T–9 and 0.3 part N-laurylmorpholine, 43.3 parts of toluene diisocyanate is mixed in within 7 seconds and the foam is poured as described in Example I. No amine odor is noticed in this formulation.

I claim as my invention:

1. A curable polymeric composition, in which the polymer is selected from the group consisting of polyurethane, 1,2-epoxy resin and polycarbonate, containing from about 0.05% to about 1% by weight of a curing catalyst of the following structure:

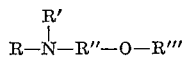

where R is sec-alkyl or cycloalkyl, R' is hydrogen, sec-alkyl, cycloalkyl or hydroxyalkyl, R'' is alkylene, and R''' is alkyl or hydroxyalkyl.

2. The composition of claim 1 in which the polymer is polyurethane.

3. The composition of claim 1 in which the polymer is 1,2-epoxy resin.

4. The composition of claim 1 in which the polymer is polycarbonate.

5. The compostion of claim 1 in which R is sec-alkyl of from 3 to about 20 carbon atoms.

6. The composition of claim 1 wherein R and R' each is sec-alkyl of from 3 to about 20 carbon atoms.

7. The composition of claim 6 being N,N-di-isopropyl-2-ethoxyethyl amine.

8. The composition of claim 1 in which R is cycloalkyl containing 3 to about 8 carbon atoms in the ring.

9. The composition of claim 1 wherein R and R' each is cyclo-alkyl containing from 3 to about 8 carbon atoms in the ring.

10. The composition of claim 9 being N,N-di-cyclohexyl-2-ethoxyethyl amine.

11. The composition of claim 1 in which R is cyclohexyl and R' is hydroxyethyl.

12. The composition of claim 1 in which R is cyclohexyl and R' is hydroxypropyl.

References Cited

UNITED STATES PATENTS

| 2,994,673 | 8/1961 | Capron et al. | 260—47 |
| 3,466,248 | 9/1969 | Rosenwald | 260—45.9 |

WILLAM H. SHORT, Primary Examiner

T. E. PERTILLA, Assistant Examiner

U.S. Cl. X.R.

260—2, 2.5, 59, 77.5, 830